(12) United States Patent
Dowd et al.

(10) Patent No.: US 7,080,529 B2
(45) Date of Patent: Jul. 25, 2006

(54) METHOD FOR MAKING LARGE DIAMETER OPTICAL WAVEGUIDE HAVING BRAGG GRATING AND BEING CONFIGURED FOR REDUCING THE BULK MODULUS OF COMPRESSIBILITY THEREOF

(75) Inventors: Edward M. Dowd, Madison, CT (US); Joseph J. Baraglia, New Britain, CT (US); Andrew S. Kuczma, Clinton, CT (US); Brian J. Pike, Wallingford, CT (US); Thomas W. Engel, East Hampton, CT (US); Martin A. Putnam, Cheshire, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 323 days.

(21) Appl. No.: 10/458,773

(22) Filed: Jun. 9, 2003

(65) Prior Publication Data
US 2004/0050111 A1    Mar. 18, 2004

Related U.S. Application Data

(60) Provisional application No. 60/387,174, filed on Jun. 7, 2002.

(51) Int. Cl.
*C03B 37/023* (2006.01)
(52) U.S. Cl. .............................. 65/393; 65/408; 65/409; 65/411; 65/412
(58) Field of Classification Search .......... 65/408–412, 65/393; 385/126; 264/1.28
See application file for complete search history.

(56) References Cited

U.S. PATENT DOCUMENTS 3,646,472 A * 2/1972 Cooper et al. ................ 372/72
3,814,499 A * 6/1974 Marcatili .................... 385/123

(Continued)

FOREIGN PATENT DOCUMENTS

JP         57 038331         3/1982

(Continued)

OTHER PUBLICATIONS

Patent Abstracts of Japan, "Preparation of Parent Material of Optical Glass Fiber," Sep. 11, 1982, vol. 006, No. 177 (C-124).

(Continued)

*Primary Examiner*—John Hoffmann
(74) *Attorney, Agent, or Firm*—Patterson & Sheridan, LLP

(57) ABSTRACT

The present invention provides a method for making a multicore large diameter optical waveguide having a cross-section of at least about 0.3 millimeters, two or more inner cores, a cladding surrounding the two or more inner cores, and one or more side holes for reducing the bulk modulus of compressibility and maintaining the anti-buckling strength of the large diameter optical waveguide. The method features the steps of: assembling a preform for drawing a multicore large diameter optical waveguide having a cross-section of at least about 0.3 millimeters, by providing an outer tube having a cross-section of at least about 0.3 millimeters and arranging two or more preform elements in relation to the outer tube; heating the preform; and drawing the large diameter optical waveguide from the heated preform. In one embodiment, the method also includes the step of arranging at least one inner tube inside the outer tube.

3 Claims, 3 Drawing Sheets

Dual Core Preform Assembly w/ Nested Tubes

U.S. PATENT DOCUMENTS

| | | | |
|---|---|---|---|
| 3,844,752 A | 10/1974 | Kaiser | |
| 3,902,089 A * | 8/1975 | Beasley et al. | 313/105 R |
| 3,990,874 A * | 11/1976 | Schulman | 65/393 |
| 4,127,398 A * | 11/1978 | Singer, Jr. | 65/393 |
| 4,725,110 A | 2/1988 | Glenn et al. | |
| 4,807,950 A | 2/1989 | Glenn et al. | |
| 4,832,720 A | 5/1989 | Watanabe et al. | |
| 4,978,377 A * | 12/1990 | Brehm et al. | 65/403 |
| 5,017,206 A * | 5/1991 | Miller et al. | 65/406 |
| 5,042,897 A | 8/1991 | Meltz et al. | |
| 5,061,032 A | 10/1991 | Meltz et al. | |
| 5,309,540 A * | 5/1994 | Turpin et al. | 385/123 |
| 5,388,173 A | 2/1995 | Glenn | |
| 5,471,553 A * | 11/1995 | Teshima | 385/125 |
| 6,154,594 A | 11/2000 | Fiacco et al. | |
| 6,260,388 B1 * | 7/2001 | Borrelli et al. | 65/393 |
| 6,444,133 B1 * | 9/2002 | Fajardo et al. | 216/24 |
| 6,705,126 B1 * | 3/2004 | Paek et al. | 65/395 |
| 6,826,339 B1 * | 11/2004 | Mueller | 385/122 |
| 6,917,741 B1 * | 7/2005 | Fekety et al. | 385/125 |
| 2003/0161599 A1 * | 8/2003 | Broderick et al. | 385/125 |
| 2005/0247082 A1 * | 11/2005 | Kersey et al. | 65/393 |

FOREIGN PATENT DOCUMENTS

| | | | |
|---|---|---|---|
| JP | 57058104 A | * | 4/1982 |

OTHER PUBLICATIONS

Patent Abstracts of Japan, "Manufacture of Base Material For Multicore Fiber," Jun. 16, 1982, vol. 006, No. 106 (C-108).

Patent Abstracts of Japan, "Production of Matrix for Optical Fiber With Eccentric Core," Sep. 10, 1991, vol. 015, No. 357 (C-0866).

* cited by examiner

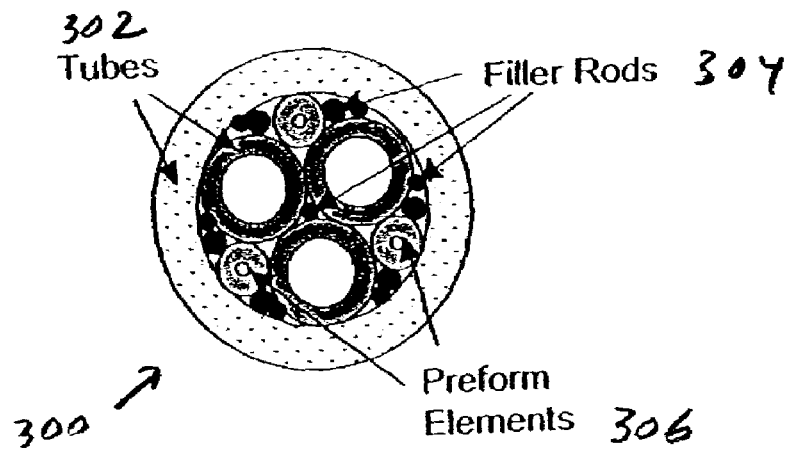
Fig. 1: Tri-core Preform Assembly
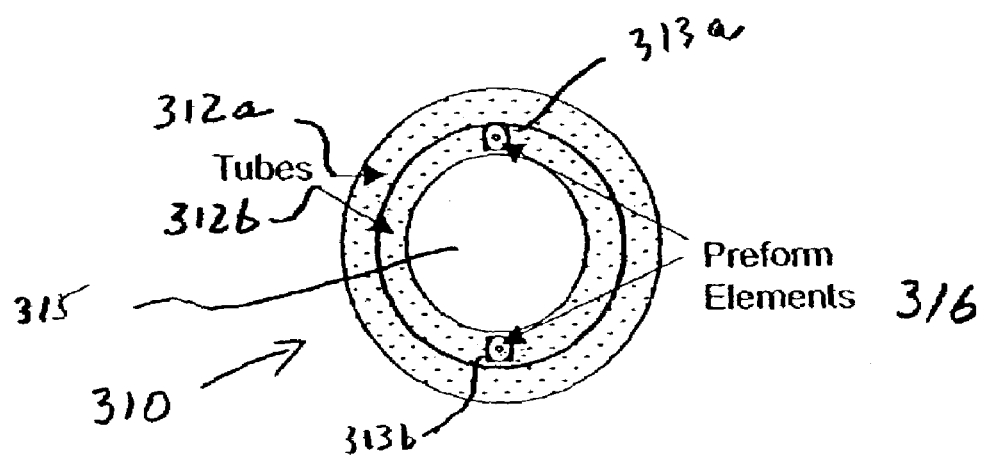
Fig. 2: Dual Core Preform Assembly w/ Nested Tubes

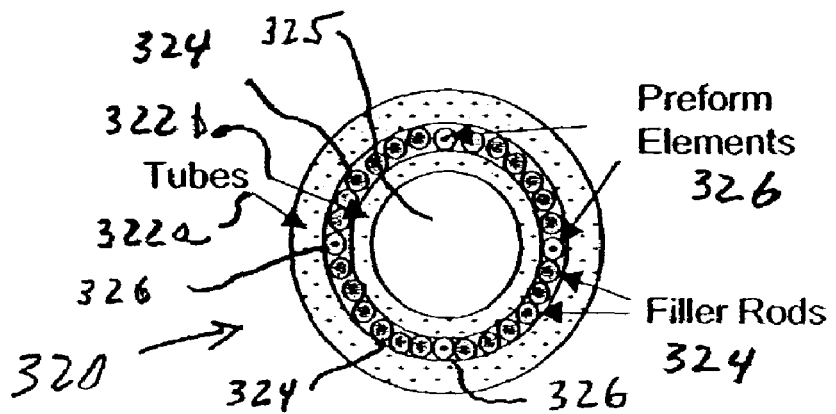
Fig. 3: Dual Core Preform Assembly w/ Nested Tubes and Filler Rods
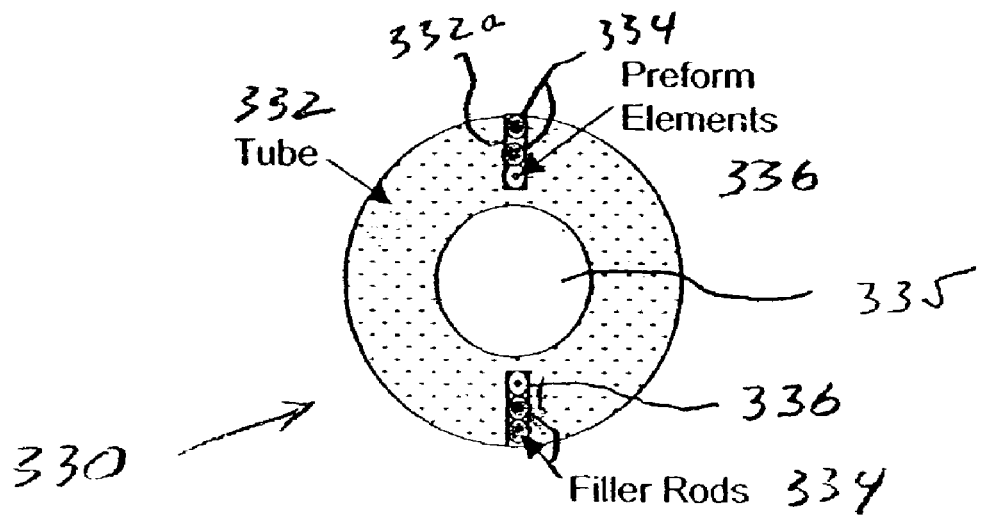
Fig. 4: Dual Core Preform Assembly

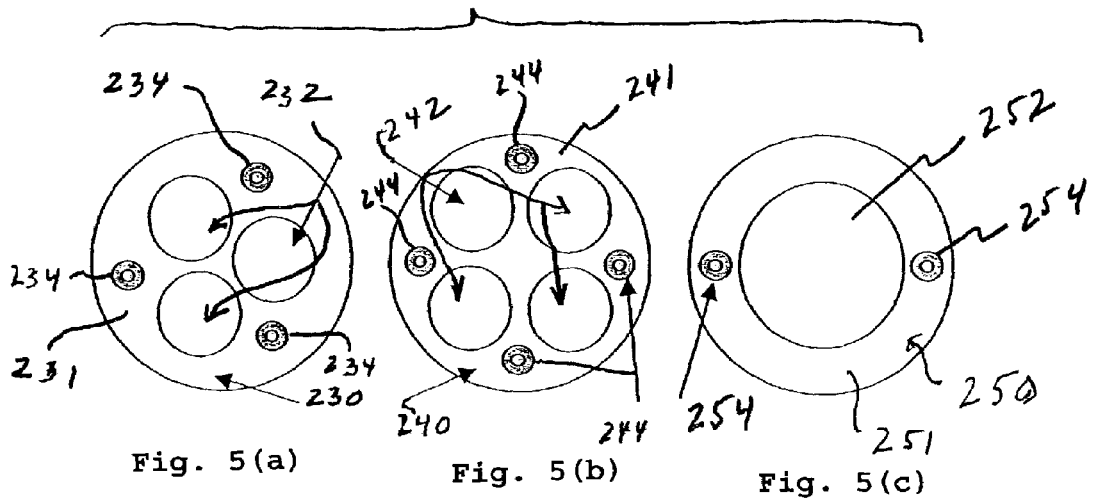
Fig. 5
Fig. 5(a)  Fig. 5(b)  Fig. 5(c)
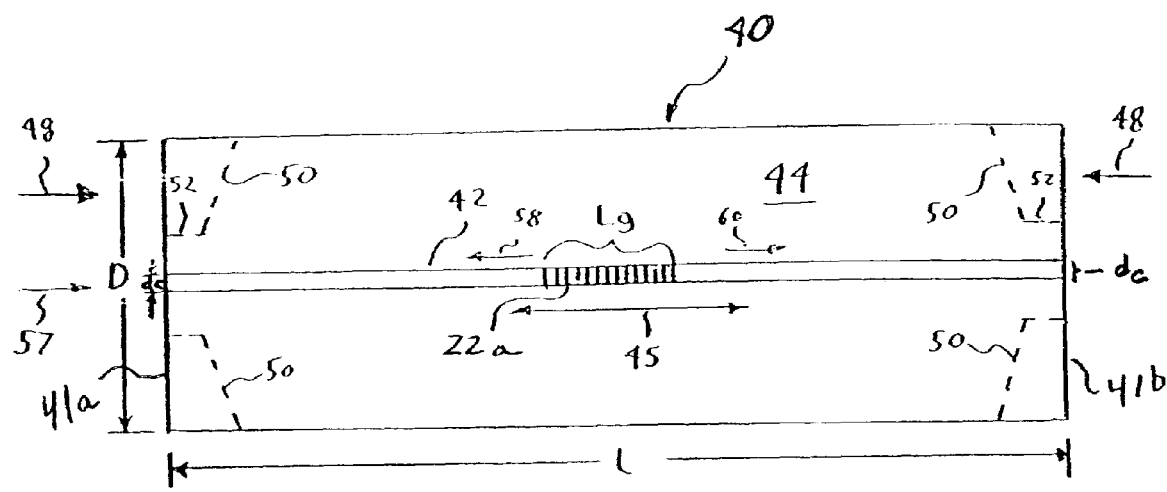
Fig. 6: Large Diameter Optical Waveguide with Bragg Grating

US 7,080,529 B2

METHOD FOR MAKING LARGE DIAMETER OPTICAL WAVEGUIDE HAVING BRAGG GRATING AND BEING CONFIGURED FOR REDUCING THE BULK MODULUS OF COMPRESSIBILITY THEREOF

CROSS-REFERENCE TO RELATED APPLICATIONS

This application claims benefit to provisional patent application Ser. No. 60/387,174, filed Jun. 7, 2002.

BACKGROUND OF THE INVENTION

1. Technical Field

The present invention generally relates to a method for manufacturing an optical component; and more particularly to a method for manufacturing a large diameter cane waveguide having a cross-section of at least about 0.3 millimeters, two or more inner cores, a cladding surrounding the two or more inner cores and side holes for reducing the bulk modulus of compressibility and maintaining the anti-buckling strength of the large diameter optical waveguide.

2. Description of Related Art

There are known methods for drawing an optical fiber, as well as a large diameter cane waveguide having a cross-section of at least about 0.3 millimeters, two or more inner cores, a cladding surrounding the two or more inner cores. The present invention relates to and satisfies a need in the industry for drawing such a large diameter cane waveguide with a structural configuration for reducing the bulk modulus of compressibility and maintaining the anti-buckling strength of the large diameter optical waveguide.

SUMMARY OF THE INVENTION

Cane elements are ideally drawn from an assembled glass preform composed of tubes, filler rods, and optical preform elements. Standard optical fiber preform vapor deposition processes such as MCVD, OVD or VAD can be used to fabricate preform elements. Preform elements may be pre-drawn to predetermined diameters to yield proper core size when the assembly is finally drawn. Filler rods are used to minimize distortion of circular optical cores during the draw process.

In its broadest sense, the present invention provides a method for making a multicore large diameter waveguide having a cross-section of at least about 0.3 millimeters, two or more inner cores, a cladding surrounding the two or more inner cores, and a structural configuration for reducing the bulk modulus of compressibility and maintaining the anti-buckling strength of the large diameter optical waveguide. The method features the steps of:

assembling a preform for drawing the multicore large diameter waveguide by providing an outer tube having a cross-section of at least about 0.3 millimeters, and arranging two or more preform elements in relation to the outer tube;

heating the preform; and drawing the large diameter waveguide from the preform.

In one embodiment, the method also includes the step of arranging at least one inner tube inside the outer tube.

In this embodiment, the at least one inner tube may include three inner tubes symmetrically arranged inside the outer tube. The two or more preform elements may be arranged between the outer tube and the three inner tubes. The method also includes arranging one or more filler rods in one or more voids between the outer tube and the three inner tubes, as well as arranging one or more filler rods in a void between three inner tubes.

In another embodiment, the method also comprises the steps of notching the at least one inner tube with two or more notches; and providing a respective preform element in each notch.

In still another embodiment, the method may also include the step of circumferentially arranging one or more filler rods between the at least one inner tube and the outer tube in relation to the two or more preforms. The two or more preforms may be diametrically opposed, or arranged at 0, 90, 180 and 270 degrees.

In still another embodiment, the method also includes the steps of notching the outer tube with two or more notches; and providing a respective preform element in each notch. The notches may be diametrically opposed. This method also includes the steps of arranging one or more filler rods in each notch.

The foregoing and other objects, features and advantages of the present invention will become more apparent in light of the following detailed description of exemplary embodiments thereof.

BRIEF DESCRIPTION OF THE DRAWING

The drawing, not drawn to scale, include the following Figures:

FIG. 1 shows a preform assembly according to a method for making a large diameter optical waveguide according to the present invention.

FIG. 2 shows a nested tube preform assembly according to a method for making a large diameter optical waveguide according to the present invention.

FIG. 3 shows a nested tube with filler rods according to a method for making a large diameter optical waveguide according to the present invention.

FIG. 4 shows a preform assembly according to a method for making a large diameter optical waveguide according to the present invention.

FIG. 5 includes FIGS. 5(a), 5(b) and 5(c); FIG. 5(a) is a diagram of an embodiment of a large diameter optical waveguide having multiple holes with a clover leaf design and multiple cores with Bragg grating written therein; FIG. 5(b) is a diagram of an embodiment of a large diameter optical waveguide having multiple holes with a honeycomb-like design and multiple cores with Bragg grating written therein; and FIG. 5(c) is a diagram of an embodiment of a large diameter optical waveguide having a tubular hole and diametrically opposed multiple cores with Bragg grating written therein.

FIG. 6 is a diagram of a large diameter optical waveguide having a Bragg grating written therein.

BEST MODE FOR CARRYING OUT THE INVENTION

FIGS. 1–4: Methods of Manufacture

FIG. 1 shows an example of a tri-core preform assembly design for use in a method for making a multicore large diameter optical waveguide 230 (FIG. 5(a)) having a cross-section of at least about 0.3 millimeters, two or more inner cores 234, a cladding 231 surrounding the two or more inner cores 234, and a structural configuration 232 for reducing the bulk modulus of compressibility and maintaining the anti-buckling strength of the large diameter optical waveguide. The method includes the steps of:

assembling a preform generally indicated as 300 for drawing the multicore large diameter optical waveguide 230 in FIG. 5(a) by providing an outer tube 302 having a cross-section of at least about 0.3 millimeters, and arranging two or more preform elements 306 in relation to the outer tube 302;

heating the preform assembly 300; and drawing the large diameter optical waveguide 231 from the preform 300.

In the preform assembly 300, three inner tubes are symmetrically arranged inside the outer tube. The two or more preform elements 306 are arranged between the outer and inner tubes 302. Filler rods 304 are arranged in voids between the inner and outer tubes 302 in relation to the two or more preforms 306. As shown, one filler rod is arranged in a void between three inner tubes 302. Techniques for heating the preform and drawing a large diameter optical waveguide from a heated preform are known in the art, and the scope of the invention is not intended to be limited to any particular kind or type thereof.

FIG. 2 shows an example of a 'nested tube' preform assembly design generally indicated as 310 having nested tubes 312a, 312b for use in a method for making a multicore large diameter optical waveguide. The tube 312b defines the hole 315. One or more of the tubes 312b is notched 313a, 313b to accept one or more preform elements 316. The notches 313a, 313b are cut to produce a minimal gap around the preform element 316 in order to reduce core distortion during the draw process. Core distortion may be further reduced with a core element that is shaped to fit the notch 313a, 313b, for example, grinding the preform element 316. The preform assembly 310 is heated and drawn to provide the large diameter optical waveguide 250 in FIG. 5(c).

FIG. 3 shows another example of a multi-core preform assembly design generally indicated as 320 that is also heated and drawn to provide the large diameter optical waveguide 250 in FIG. 5(c). This preform assembly 320 consists of nested tubes 322a, 322b with preform elements 326 and filler rods 324 located between them. The tube 322b defines the hole 325. The two or more preforms 326 may be diametrically opposed, or arranged at 0, 90, 180 and 270 degrees, as shown. The scope of the invention is not intended to be limited to how the preforms are arranged in the assembly. In this design, some or all of the filler rods 324 may be substituted with preform elements 326.

FIG. 4 shows yet another preform assembly design generally indicated as 330 that consists of a notched tube 332 filled with preform elements 336 and filler rods 334. The preform assembly 330 may also be heated and drawn to provide the large diameter optical waveguide 250 in FIG. 5(c). The notched tube 332 defines the hole 335. The tube 322b defines the hole 325. The two or more preforms 336 may be diametrically opposed, as shown, or arranged at 0, 90, 180 and 270 degrees. The scope of the invention is not intended to be limited to how the preforms are arranged in the assembly. The scope of the invention is intended to include forming the filler rods 334 as a rectangular cross section shaped glass to minimize core distortion.

FIGS. 5, 5(a), (b) and (c)

FIG. 5 shows three multiple off-center core designs, two of which are discussed above.

FIG. 5(a) shows the large diameter optical waveguide generally indicated as 230 including a cladding 231 having multiple holes 232 with a honeycomb design and multiple cores 234 with Bragg grating (not shown) written therein. The multiple holes 232 include three symmetrically arranged holes 232. The multiple cores 234 include three cores 234 symmetrically arranged about the holes 232. The large diameter optical waveguide generally indicated as 230 is the result of using the preform 300 (FIG. 1) in relation to the aforedescribed method.

FIG. 5(b) shows a large diameter optical waveguide generally indicated as 240 including a cladding 241 having multiple holes 242 and multiple cores 244 with Bragg grating (not shown) written therein. The multiple holes 242 include four symmetrically arranged holes 242. The multiple cores 244 include three cores 244 symmetrically arranged about the holes 242.

FIG. 5(c) shows a large diameter optical waveguide generally indicated as 250 including a cladding 251 having multiple holes 252 and multiple cores 254 with Bragg grating (not shown) written therein. The multiple holes 252 include four symmetrically arranged holes 252. The multiple cores 254 include three cores 254 symmetrically arranged about the holes 252. The large diameter optical waveguide generally indicated as 250 is the result of using the preform 320 (FIG. 3) in relation to the aforedescribed method.

Similar to that discussed above, the large diameter optical waveguide or cane designs in FIG. 5 allow independent Bragg gratings to be written into each core and then be coupled to individual pigtail fibers providing for a large range of wavelength tuning with a single actuated cane element. The holes in the cane reduce the effective element modulus enabling a wide range of grating wavelength tuning with reduced compressive force and buckling.

The scope of the invention is not intended to be limited to the specific number of holes 232, 242, 252 or cores 234, 244, 254, or the arrangement of the same in relation to one another, for the designs shown in FIGS. 5(a), (b) and (c). Embodiments are envisioned having more or less holes 232, 242, 252 or cores 234, 244, 254, as well as different symmetrical and non-symmetrical arrangements of holes 232, 242, 252 and cores 234, 244, 254 in relation to one another, than that shown in FIGS. 5(a), (b) and (c).

FIG. 6: The Large Diameter Optical Waveguide

FIG. 6 shows a large diameter optical waveguide generally indicated as 40 (also known as a "cane"), which is an example of the structures discussed above. The large diameter optical waveguide 40 has an inner core 42 and an outer cladding 44 surrounding the inner core 42, opposing ends 41a, 41b, and a diameter D of at least about 0.3 millimeters, similar to that disclosed in the aforementioned co-pending U.S. patent application Ser. No. 09/455,868 (CC-0230), which is hereby incorporated by reference. The inner core 42 has a Bragg grating 22a written therein for tuning by applying a compressive force indicated by arrows 48 on the opposite ends 41a, 41b of the optical waveguide 40, or for sensing an external parameter like pressure applied thereon.

Cane waveguides have proven to be useful elements for creating highly reliable tunable grating based elements, and appear to be suitable for a variety of other applications.

One of the issues associated with the tuning of cane waveguides is the force required to tune a given cane element (typically formed in a "dogbone" element). Reducing the cane diameter can reduce the force required to tune a grating a given amount; however, the element will buckle at a lower compression strain, ultimately producing a lower tuning range.

The large diameter optical waveguide 40 comprises silica glass (SiO$_2$) based material having the appropriate dopants, as is known, to allow light indicated by arrow 45 to propagate in either direction along the inner core 42 and/or within the large diameter optical waveguide 40. The inner core 42 has an outer dimension d$_c$ and the large diameter optical waveguide 40 has an outer dimension D. Other materials for the large diameter optical waveguide 40 may be used if desired. For example, the large diameter optical waveguide 40 may be made of any glass, e.g., silica, phosphate glass, or other glasses; or solely plastic.

The outer dimension D of the outer cladding 44 is at least about 0.3 millimeters; and the outer dimension d$_c$ of the inner core 42 is such that it propagates only a few spatial modes (e.g., less than about 6). For example for single spatial mode propagation, the inner core 42 has a substantially circular transverse cross-sectional shape with a diameter d$_c$ less than about 12.5 microns, depending on the wavelength of light. The invention will also work with larger or non-circular cores that propagate a few (less than about 6) spatial modes, in one or more transverse directions. The outer diameter D of the outer cladding 44 and the length L have values that will resist buckling when the large diameter optical waveguide 40 is placed in axial compression as indicated by the arrows 48.

The large diameter optical waveguide 40 may be ground or etched to provide tapered (or beveled or angled) outer corners or edges 50 to provide a seat for the large diameter optical waveguide 40 to mate with another part (not shown herein) and/or to adjust the force angles on the large diameter optical waveguide 40, or for other reasons. The angle of the beveled corners 50 is set to achieve the desired function. Further, the large diameter optical waveguide 40 may be etched or ground to provide nubs 52 for an attachment of a pigtail assembly 54 (not shown herein) to the large diameter optical waveguide 40. Further, the size of the large diameter optical waveguide 40 has inherent mechanical rigidity that improves packaging options and reduces bend losses.

In the large diameter optical waveguide 40, the Bragg grating 22a is impressed (or embedded or imprinted) therein. A Bragg grating 22a, as is known, is a periodic or aperiodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics", to Glenn et al.; and U.S. Pat. No. 5,388,173, entitled "Method and Apparatus for Forming Aperiodic Gratings in Optical Fibers", to Glenn, which are hereby incorporated by reference to the extent necessary to understand the present invention. The aperiodic variation of the gratings described herein may include a chirped grating. See also U.S. Pat. Nos. 5,042,897 and 5,061,032, both issued to Meltz et al., and hereby incorporated by reference in their entirety. As shown, the grating 22a is written in the inner core 42; however, the scope of the invention is intended to include writing the grating in the outer cladding 44, as well as a combination of the inner core 42 and the outer cladding 44. Any type of wavelength-tunable grating or reflective element embedded, etched, imprinted, or otherwise formed in the large diameter optical waveguide 40 may be used. The large diameter optical waveguide 40 may be photosensitive if the grating 22a is to be written into the large diameter optical waveguide 40. As used herein, the term "grating" means any of such reflective elements. Further, the reflective element (or grating) 22a may be used in reflection and/or transmission of light. The incoming light 57 incident on the grating 22a reflects a portion thereof as indicated by a line 58, and passes the remaining incident light 57 (within a predetermined wavelength range), as indicated by a line 60 (as is known).

The grating 22a has a grating length Lg, which is determined based on the application, and may be any desired length. A typical grating 22a has a grating length Lg in the range of about 3–40 millimeters. Other sizes or ranges may be used if desired. The length Lg of the grating 22a may be shorter than or substantially the same length as the length L of the large diameter optical waveguide 40. Also, the inner core 42 need not be located in the center of the large diameter optical waveguide 40 but may be located anywhere in the large diameter optical waveguide 40.

Accordingly, an outer diameter D of greater than about 400 microns (0.4 millimeters) provides acceptable results (without buckling) for a waveguide length L of 5 millimeters, over a grating wavelength tuning range of about 10 nm. For a given outer diameter D as the length L increases, the wavelength tuning range (without buckling) decreases. Other diameters D for the large diameter optical waveguide 40 may be used depending on the overall length L of the large diameter optical waveguide 40 and the desired amount of compression length change ΔL or wavelength shift Δλ.

The large diameter optical waveguide 40 may be made using fiber drawing techniques that provide the resultant desired dimensions for the core and the outer diameter discussed hereinbefore. As such, the external surface of the large diameter optical waveguide 40 will likely be optically flat, thereby allowing Bragg gratings to be written through the cladding similar to that which is done for conventional optical fiber. Because the large diameter optical waveguide 40 has a large outer diameter compared to that of a standard optical fiber (e.g., 125 microns), the large diameter optical waveguide 40 may not need to be coated with a buffer and then stripped to write the gratings, thereby requiring less steps than that needed for conventional optical fiber gratings. Also, the large outer diameter D of the large diameter optical waveguide 40, allows the waveguide to be ground, etched or machined while retaining the mechanical strength of the large diameter optical waveguide 40. The large diameter optical waveguide 40 is easily manufacturable and easy to handle, and may be made in long lengths (on the order of many inches, feet, or meters) then cut to size as needed for the desired application.

Also, the large diameter optical waveguide 40 does not exhibit mechanical degradation from surface ablation common with optical fibers under high laser fluency (or power or intensity) during grating exposure (or writing). In particular, the thickness of the cladding between the cladding outer diameter and the core outer diameter causes a reduced power level at the air-to-glass interface for a focused writing beam.

The large diameter optical waveguide also reduces coupling between the core and cladding modes due to the increased end cross-sectional area between the core and cladding of the waveguide. Thus, the gratings 22a written in the inner core 42 of the large diameter optical waveguide 40 exhibit less optical transmission loss and exhibits a cleaner optical profile than a conventional fiber grating because the large cladding region dissipates coupled cladding modes, thereby reducing the coupling of the inner core 42 to the outer cladding 44 modes. In general, the greater the difference in the cross-sectional area between the inner core 42 and the outer cladding 44 the smaller the mode field overlap and the lower the coupling to the cladding modes. The thickness of the outer cladding 44 between the cladding outer diameter and the core outer diameter may be set to optimize this effect. Other diameters of the inner core 42 and the large diameter optical waveguide 40 may be used if desired such that the cladding modes are reduced to the desired levels.

The large diameter optical waveguide 40 may have end cross-sectional shapes other than circular, such as square, rectangular, elliptical, clam-shell, octagonal, multi-sided, or any other desired shapes, discussed more hereinafter. Also, the waveguide may resemble a short "block" type or a longer "cane" type geometry, depending on the length of the waveguide and outer dimension of the waveguide.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein.

For example, although the invention is described in relation to long period gratings, the inventors envision other embodiments using blazed gratings, periodic or aperiodic gratings, or chirped gratings.

Although the invention has been described and illustrated with respect to exemplary embodiments thereof, the foregoing and various other additions and omissions may be made therein without departing from the spirit and scope of the present invention.

What is claimed is:

1. A method for making a multicore optical waveguide having a cross-section of at least about 0.3 millimeters, two or more inner cores, and a cladding surrounding the two or more inner cores, comprising the steps of:

assembling a preform for drawing the multicore optical waveguide by providing an outer tube having a cross-section of at least about 0.3 millimeters, arranging two or more preform elements in relation to the outer tube, and arranging a hollow inner tube inside the outer tube, wherein the two or more preform elements supply the two or more inner cores;

notching the inner tube with two or more notches providing a respective one of the preform elements in each notch; heating the preform; and drawing the optical waveguide from the preform, thereby defining the cross section that is greater than about 0.3 millimeters in all directions upon completion of the drawing, and thereby leaving in an area of the optical waveguide that has been drawn a longitudinal aperture extending through the optical waveguide, wherein the longitudinal aperture is formed by the hollow inner tube.

2. A method according to claim 1, wherein the two or more preform elements are arranged between the outer tube and the at least one inner tube.

3. A method according to claim 1, wherein the inner and outer tubes are concentric.

* * * * *